United States Patent
Adler et al.

(10) Patent No.: US 10,237,515 B2
(45) Date of Patent: Mar. 19, 2019

(54) MEMS PROJECTOR USING MULTIPLE LASER SOURCES

(71) Applicant: STMicroelectronics Ltd, Netanya (IL)

(72) Inventors: Gilad Adler, Herzeliya (IL); Sason Sourani, Hod Hasharon (IL)

(73) Assignee: STMicroelectronics Ltd, Netanya (IL)

( * ) Notice: Subject to any disclaimer, the term of this patent is extended or adjusted under 35 U.S.C. 154(b) by 0 days.

(21) Appl. No.: 15/471,333

(22) Filed: Mar. 28, 2017

(65) Prior Publication Data

US 2018/0288366 A1    Oct. 4, 2018

(51) Int. Cl.
| | | |
|---|---|---|
| *H04N 7/01* | (2006.01) | |
| *G09G 3/02* | (2006.01) | |
| *H04N 9/31* | (2006.01) | |
| *G02B 26/10* | (2006.01) | |
| *G02B 26/08* | (2006.01) | |

(52) U.S. Cl.
CPC ......... *H04N 7/0127* (2013.01); *G02B 26/101* (2013.01); *G02B 26/105* (2013.01); *G09G 3/02* (2013.01); *H04N 9/3129* (2013.01); *H04N 9/3161* (2013.01); *H04N 9/3164* (2013.01); *H04N 9/3188* (2013.01); *G02B 26/0833* (2013.01); *G09G 2310/0224* (2013.01)

(58) Field of Classification Search
CPC .......... H04N 5/74; H04N 7/01; H04N 7/0127; H04N 9/3129; H04N 9/3161
USPC .................................................. 348/744, 446
See application file for complete search history.

(56) References Cited

U.S. PATENT DOCUMENTS

| | | | |
|---|---|---|---|
| 8,908,092 B2 * | 12/2014 | Tang | .................... H04N 9/3188 348/441 |
| 9,670,056 B2 * | 6/2017 | Carminati | ............. B81B 3/0062 |
| 2011/0234898 A1 * | 9/2011 | Goren | .................. H04N 9/3129 348/446 |

FOREIGN PATENT DOCUMENTS

| | | |
|---|---|---|
| JP | 2007047243 A | 2/2007 |
| JP | 2011186045 A | 9/2011 |
| KR | 20120091810 A | 8/2012 |
| WO | 2016203991 A1 | 12/2016 |

OTHER PUBLICATIONS

EPO Search Report and Written Opinion for co-pending EP Appl. No. 17186470.5 dated Jun. 25, 2018 (12 pages).

* cited by examiner

*Primary Examiner* — Trang U Tran
(74) *Attorney, Agent, or Firm* — Crowe & Dunlevy

(57) ABSTRACT

Disclosed herein is an electronic device including a first laser source configured to project a first laser beam, and a second laser source configured to project a second laser beam in alignment with the first laser beam in a first direction but at an angle with respect to the first laser beam in a second direction. A mirror apparatus is positioned so as to reflect the first and second laser beams. Control circuitry is configured to control the mirror apparatus to simultaneously reflect the first and second laser beams in a first scan pattern to form an first image, the first image formed from the first scan pattern having a number of scan lines greater than two times a horizontal resonance frequency at which the mirror apparatus oscillates divided by a desired frame rate of the first image.

26 Claims, 6 Drawing Sheets

MEMS PROJECTOR USING MULTIPLE LASER SOURCES

TECHNICAL FIELD

This disclosure relates generally to image scanning, and, more particularly, to scanning methods for use by laser scanning projectors that utilize multiple lasers to provide for increased display resolution.

BACKGROUND

Laser scanning projectors constructed from microelectromechanical system (MEMS) components can be relatively small, and therefore implemented into easily portable devices such as picoprojectors, wearable devices, lidar, and smart headlamps. These laser scanning projectors can be used to display fixed or moving video images on a screen, wall, lens (in the case of a smartglass wearable), or user's skin (in the case of a smartwatch wearable). Since modern digital media is often in a high definition format, the quality of image reproduction of such a laser scanning projector is of importance in a commercial environment.

Some parameters defining image quality are image sharpness (which determines the amount of details that a single image may convey), noise level (which is a random variation of image density, visible as grains in the image and pixel level variations in digital images), contrast (which is the slope of the tonal response curve), and distortion (i.e. an aberration that causes straight lines to curve near the edges of images).

The larger the image is, the more challenging it may be to display it at a high quality, according to the parameters defined above. This is a challenge that laser scanning projector manufacturers encounter. However, with MEMS based laser scanning projectors, this challenge may be substantially increased. The MEMS laser scanning projectors may use a very small, complex, fragile scanning mirror architecture that is based on a modulated laser source and reflective mirror mechanisms, and yet there are several problems associated with MEMS laser projectors that lead to lowering the image quality.

In general, MEMS laser scanning projectors function by optically combining red, green, and blue laser beams to form an RGB laser beam, and then directing the RGB laser beam to either a bi-axial mirror, or a set of two uni-axial mirrors working in tandem. The mirror or mirrors are controlled so as to move, or "scan" the laser in a series of vertically spaced apart horizontal lines at a rate of speed such that the human eye perceived a complete image.

The mass of MEMS mirrors renders it extremely difficult to operate the mirror or mirrors according to step functions. Therefore, the vertical scanning is performed continuously, with a typical resulting scan pattern being shown in FIG. 1A. As shown, the horizontal scan lines are tilted. This may result in the image not being properly displayed—as may be noted, some parts of the image are never reached while others are scanned twice. Therefore, this common scanning method described above may result in a discontinuous image, which is commercially undesirable.

Therefore, extensive research and development has been performed to produce new scanning methods and techniques. One such exemplary scanning technique is described in U.S. Pat. Pub. 2011/0234898 to Goren. In this patent application, a laser is scanned in a first scan pattern, shown in FIG. 1B. Once the first scan pattern has been formed, that laser is then scanned in a second scan pattern shown in FIG. 1C. In these scan patterns, each scan line SL0-SL7 is formed by the laser moving from one corner of the scan line to the diagonally opposing corner of that scan line. The scan period between the first and second scan patterns is quick enough such that the human eye perceives a single image, as shown in FIG. 1D. The use of the different scan patterns helps to correct the discontinuous image issues described above.

However, due to the mass of the mirror or mirrors and due to the physical limitations in the construction thereof, using the above techniques to generate images with HD or greater than HD resolutions may be extremely difficult—it may not be possible to move mirrors at a rate fast enough to generate the requisite number of scan lines, for example.

Therefore, further development in the area of scanning laser projectors is needed.

SUMMARY

Figure 1A:
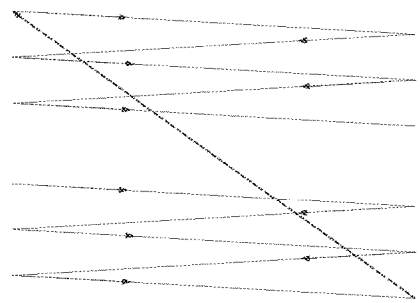
FIG. 1A shows a typical scan pattern for a scanning laser projector, in accordance with the prior art.
Figure 1B:
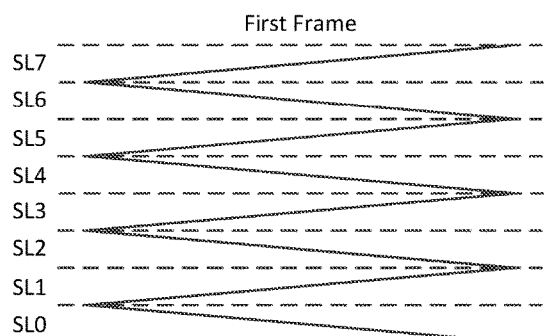
FIG. 1B shows a first scan pattern for a dual frame scanning laser projector, in accordance with the prior art.
Figure 1C:
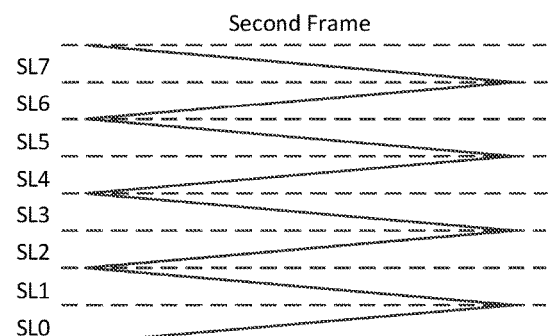
FIG. 1C shows a second scan pattern for a dual frame scanning laser projector, in accordance with the prior art.
Figure 1D:
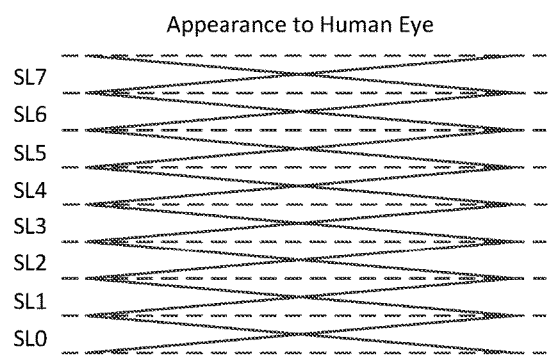
FIG. 1D shows the appearance to the human eye of an image formed by the dual frame scanning laser projector.

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is an electronic device including a first laser source configured to project a first laser beam, and a second laser source configured to project a second laser beam in alignment with the first laser beam in a first direction but at an angle with respect to the first laser beam in a second direction. A mirror apparatus is positioned so as to reflect the first and second laser beams. Control circuitry is configured to control the mirror apparatus to simultaneously reflect the first and second laser beams in a first scan pattern to form an first image, the first image formed from the first scan pattern having a number of scan lines greater than two times a horizontal resonance frequency at which the mirror apparatus oscillates divided by a desired frame rate of the first image.

The control circuitry may control the mirror apparatus such that the number of scan lines of the first scan pattern are equal to four times the horizontal resonance frequency at which the mirror apparatus oscillates divided by the desired frame rate of the first image.

The control circuitry may be further configured to control the mirror apparatus to simultaneously reflect the first and second laser beams in a second scan pattern different than the first scan pattern to form a second image, with the second image formed from the second scan pattern having a number of scan lines equal to greater than two times the horizontal resonance frequency at which the mirror apparatus oscillates divided by a frame rate of the second image.

The second image may be formed from the second scan pattern having a number of scan lines equal to four times the horizontal resonance frequency at which the mirror apparatus oscillates divided by a frame rate of the second image, and the first image may be formed from the first scan pattern having a number of scan lines equal to four times the horizontal resonance frequency at which the mirror apparatus oscillates divided by a frame rate of the first image.

The control circuitry may control the mirror apparatus such that, in the second scan pattern, the first and second laser beams are vertically offset from their positions in the first scan pattern by at least one scan line.

The control circuitry may control the mirror apparatus so as to alternate between the first scan pattern and the second scan pattern.

The control circuitry may control the mirror apparatus such that, in the first scan pattern, the first laser beam begins scanning from a first edge of an outer perimeter scan line and the second laser beam begins scanning from a second edge of the outer perimeter scan line.

The control circuitry may control the mirror apparatus such that, in the second scan pattern, the first laser beam begins scanning from a middle of the outer perimeter scan line and the second laser beam begins scanning from the middle of the outer perimeter scan line.

The control circuitry may control the mirror apparatus such that, in the first scan pattern, the first laser beam and second laser beam remain horizontally synchronized during scanning of a plurality of scan lines.

The first direction may be a horizontal direction, and the second direction may be a vertical direction.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Disclosed herein is an advanced design for a laser scanning projector and methods for its operation. In order to achieve a specific density of pixels, the coverage of an image formed by a laser projector on a two-dimension screen has to be dense enough to enable delivering of optical power to each of the pixels. A minimal number of lines and pixels per line are therefore required.

Prior art laser scanning projectors operate using a horizontal mirror to project a laser along a pattern of a number of lines equal to double the ratio of horizontal mirror cycles divided by the desired frame rate. Stated another way, the number is lines produced by prior art laser scanning projectors can be mathematically represented as:

$$Nlines = 2 * \frac{Hresonance[Hz]}{FrameRate[Hz]}$$

A chart of common display formats and the required horizontal resonances therefor is shown below:

| Video Mode | Resolution | Pixels Per Inch | Frame Rate | Horizontal Resonance |
|---|---|---|---|---|
| 720p | 1,280 × 720 | 921,600 | 72 Hz | 25.92 kHz |
| 1080p | 1,920 × 1,080 | 2,073,600 | 60 Hz | 32.4 kHz |
| 1440p | 2,560 × 1,440 | 3,686,400 | 60 Hz | 43.2 kHz |

As can be seen from the table, the required horizontal resonant frequency for 1080p and 1440p, which are common HD standards, are 32.4 kHz and 43.2 kHz respectively. As will be explained below, reliable operation at these horizontal resonance frequencies is difficult to achieve using prior art scanning techniques. As will be further explained below, by using the scanning techniques disclosed herein, the requisite horizontal resonance frequency may be reduced. For example, in some instances, the requisite horizontal resonance frequency may be reduced by a factor of two.

The size of a laser as it appears on the projected image surface is the basic unit which the size of a pixel is defined. The/refore, it follows that in order to achieve the desired number of pixels per line, and therefore the desired resolution, the size of the laser spot should be small enough such that the projected image fits on the two-dimensional screen.

The spot size may be defined by the optical resolution R, which is proportional to the wavelength λ, and inversely proportional to the mirror diameter D. This relationship can be mathematically represented as:

$$\alpha \propto \frac{\lambda}{D}$$

The high resolution used for the above shown HD standards means that a larger mirror diameter is used to achieve a smaller laser spot, such that a higher resolution image can be formed for a given size two-dimensional screen.

A larger mirror leads to a larger inertial mass. This, together with other design considerations, as well as manufacturing difficulties, renders HD resolutions difficult to produce using the prior art scanning techniques.

Figure 2:
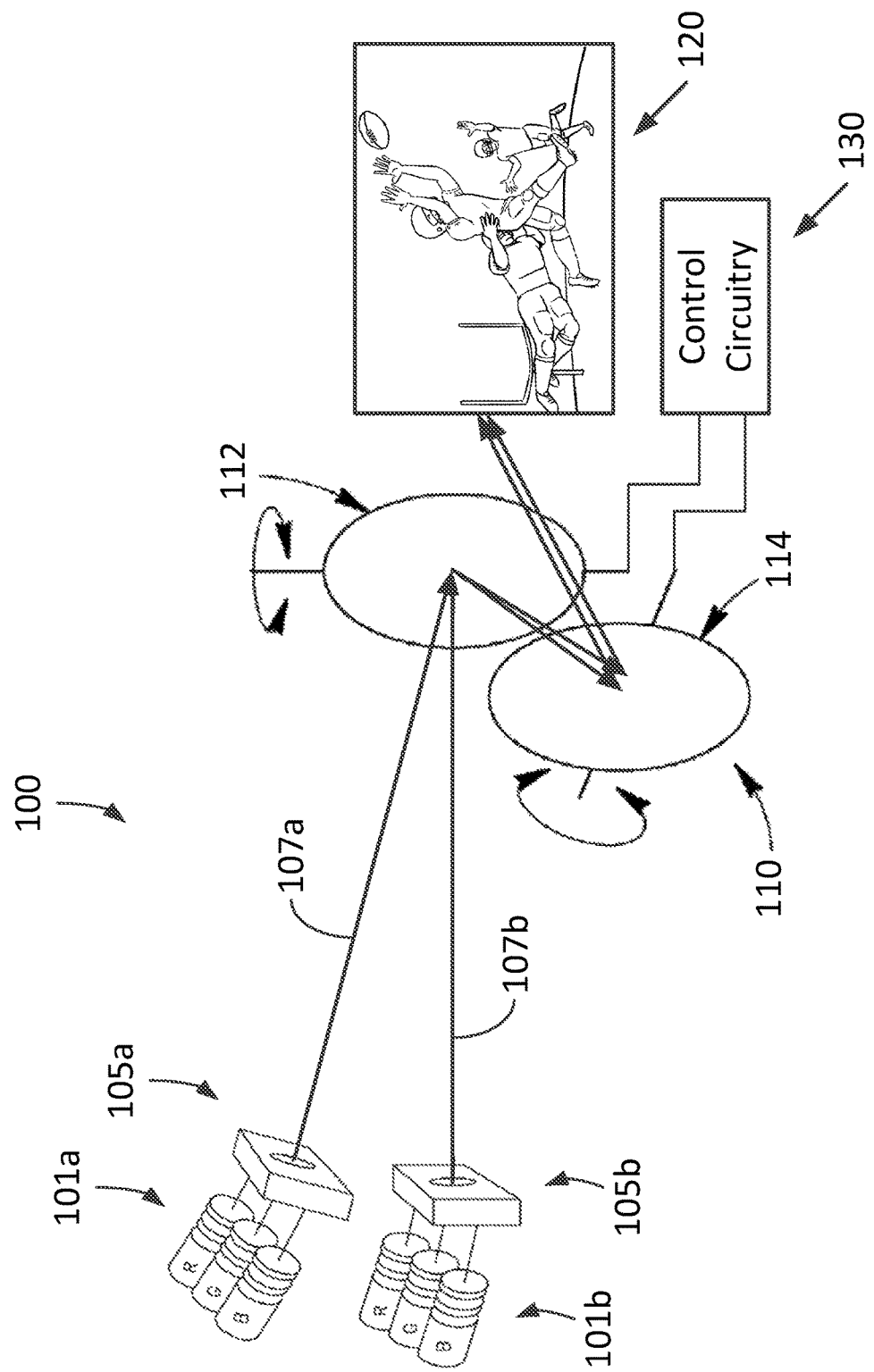
FIG. 2 shows a MEMS dual laser projector be used to form the scan patterns disclosed herein.

With initial reference to FIG. 2, a laser scanning projector 100 that addresses the above issues is now described. The laser scanning projector 100 is implemented in microelectromechanical (MEMS) technology.

The laser scanning projector 100 includes a first modulated laser source 101a and a second modulated laser source 101b. Each of the first modulated laser source 101a and the second modulated laser source 101b is comprised of three laser diodes (red, green, and blue), which are combined by respective lenses to produce first and second shaped laser beams, which in turn are then projected toward respective RGB combiners 105a and 105b. The first RGB combiner 105a produces a first RGB laser beam 107a, and the second RGB combiner 105b produces a second RGB laser beam 107b.

The first and second RGB laser beams 107a and 107b are then directed toward a mirror mechanism 110, which comprises two mirrors 112 and 114. Control circuitry 130 generates driving signals for the mirrors 112 and 114, and serves to control the mirrors 112 and 114.

The mirror 112 is a horizontal scan mirror (fast axis mirror) which is a fast scanning (e.g. 8-11 KHz) resonant mirror, and the mirror 114 is a vertical scan mirror (slow axis mirror) which is a slow scanning (e.g. 55-80 Hz) linear mirror. The image is drawn during the scan cycle time of the vertical mirror 114 and projected on a two-dimension screen 120.

Figure 3:
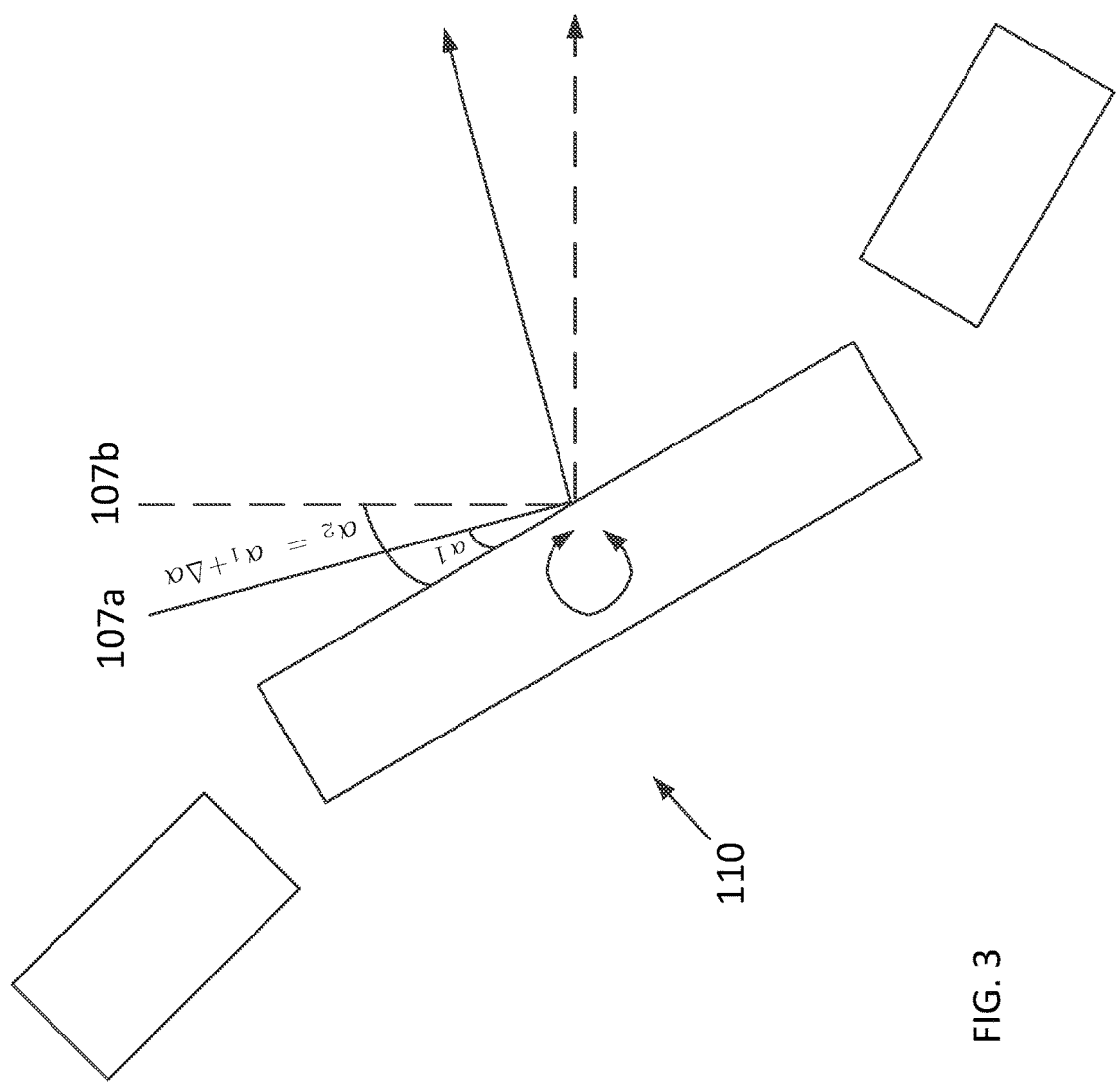
FIG. 3 shows another embodiment of a MEMS dual laser projector be used to form the scan patterns disclosed herein.

A more schematic view showing incidence of the RGB laser beams 107a and 107b on, and reflection thereby, a mirror mechanism 110 is shown in FIG. 3. Here, it can be seen that the first RGB laser beam 107a forms a first angle of incidence $\alpha_1$ with the mirror mechanism 110, and the second RGB laser beam 107b forms a second angle of incidence $\alpha_2$ with the mirror mechanism 110, with the second angle of incidence $\alpha_2$ being equal to the first angle of incidence $\alpha_1+\Delta\alpha$. Stated another way, the second RGB laser beam 107b projects its laser in alignment with the first RGB laser 107a in a first direction (i.e. the horizontal direction), but at an angle with respect to the first RGB laser 107a in a second direction (i.e. the vertical direction). Thus, the spot from the first RGB laser 107a projected on the two-dimensional screen 120 is in horizontal (first direction) alignment with the spot from the second RGB laser 107b produced on the two-dimensional screen 120, but is spaced apart vertically (second direction) therefrom by at least one scan line (in the examples below, this vertical spacing is by two scan lines). The spots from the first RGB laser 107a and second RGB laser 107b are formed on the two-dimensional screen substantially simultaneously.

In operation, the horizontal mirror 112, under control of the control circuitry 130, continuously scans the first and second RGB lasers 107a, 107b from a first edge (i.e. left side) to a second edge (i.e. right side) and back again at a horizontal (fast) scanning rate. This movement is repeated as the vertical mirror 114, also under control of the control circuitry 130, continuously shifts the spot locations of the first and second RGB lasers 107a, 107b from a third edge (i.e. top side, shown as scan line SL7) to a fourth edge (i.e. bottom side, shown as scan line SL0) at a vertical scanning (slow) rate slower than the horizontal scanning rate.

Figure 4A:
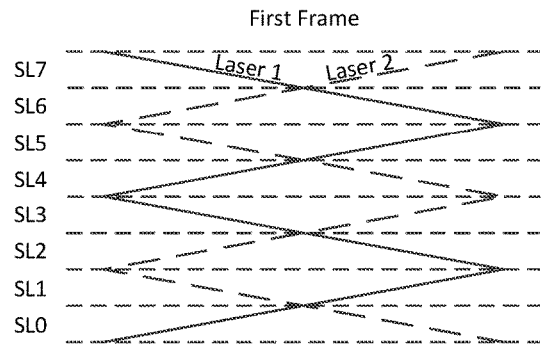
FIG. 4A shows a first scan pattern for a dual frame scanning, MEMS dual laser projector, in accordance with this disclosure.

The resulting scan pattern can be seen in FIG. 4A. Here, it should be noted that the horizontal scanning rate is such that the horizontal mirror 112 moves the first and second RGB lasers 107a, 107b across an expanse comprising half of a scan line (i.e. scan line SL7), and not a full scan line. Thus, for every one complete trip from the left edge to the right edge, the first and second RGB lasers 107a, 107b have scanned through two scan lines (i.e. scan lines SL7-SL6). Stated another way, the number of scan lines is greater than two times the horizontal scanning rate at which the horizontal mirror 112 oscillates, divided by the desired frame rate. In the example shown, the number of scan lines is equal to four times the horizontal scanning rate; this means that, for a given number of scan lines, the horizontal scanning rate of the techniques disclosed herein is one half that of the prior art. The advantages of these newly devised techniques should therefore be apparent, as they permit the doubling of display resolution for a given horizontal scanning rate.

Due to the simultaneous use of two RGB lasers 107a, 107b, the total surface area covered by the RBG lasers 107a, 107b using the slower horizontal scan rate taught herein is equal to that provided by the prior art use of one laser using the prior art scan rate, providing for acceptable image quality.

The horizontal mirror 112 and vertical mirror 114 may cooperate to repeatedly draw the scan pattern shown in FIG. 4A in a variety of ways: (1) starting from the top, reaching the bottom, and then returning to the top to begin scanning from top to bottom again, (2) starting from the top, reaching the bottom, and then beginning scanning from the bottom to the top, (3) starting from the bottom, reaching the top, and then returning to the bottom again to begin scanning from bottom to top again, and (4) starting from the bottom, reaching the top, and then beginning from the top to the bottom.

Figure 4B:
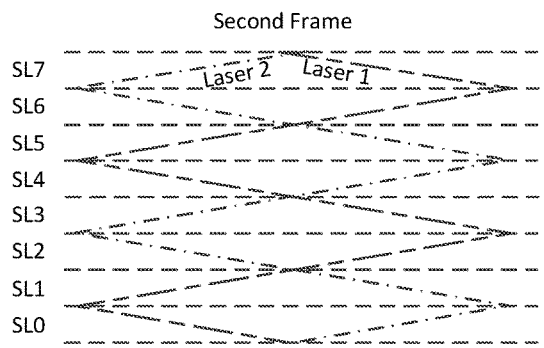
FIG. 4B shows a second scan pattern for the dual frame scanning, MEMS dual laser projector of this disclosure.

Alternatively, the horizontal mirror 112 and vertical mirror 114 may cooperate to instead repeatedly draw the scan pattern shown in FIG. 4B in a variety of ways: (1) starting from the top, reaching the bottom, and then returning to the top to begin scanning from top to bottom again, (2) starting from the top, reaching the bottom, and then beginning scanning from the bottom to the top, (3) starting from the bottom, reaching the top, and then returning to the bottom again to begin scanning from bottom to top again, and (4) starting from the bottom, reaching the top, and then beginning from the top to the bottom.

In another embodiment, the horizontal mirror 112 and vertical mirror 114 may cooperate to alternatingly draw the scan pattern shown in FIG. 4A, then draw the scan pattern shown in FIG. 4B, then draw the scan pattern shown in FIG. 4A, then draw the scan pattern shown in FIG. 4B, and so on and so forth. The horizontal mirror 112 and vertical mirror 114 may cooperate to scan both the scan patterns from FIGS. 4A-4B starting from the top toward the bottom, or scan both the scan patterns from FIGS. 4A-4B starting from the bottom toward the top. In some cases, the horizontal mirror 112 and vertical mirror 114 may instead scan the pattern from FIG. 4A from the top toward the bottom, and then scan the pattern from FIG. 4B from the bottom toward the top; or, the horizontal mirror 112 and vertical mirror 114 may scan the pattern from FIG. 4A from the bottom toward the top, and then scan the pattern from FIG. 4B from the top toward the bottom.

Figure 4C:
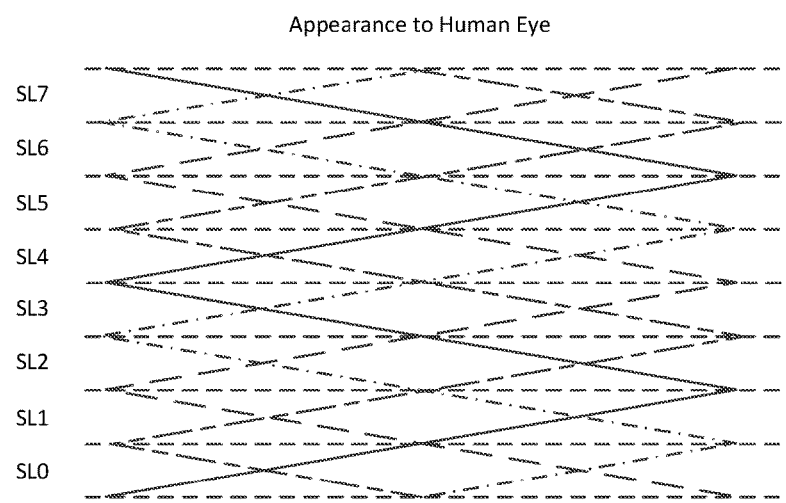
FIG. 4C shows the appearance to the human eye of an image formed by the MEMS dual frame scanning, dual laser projector of this disclosure.

By alternating between these two different scan patterns, a greater portion of the two-dimensional screen 120 is covered when perceived by the human eye, which can be seen in the representation shown in FIG. 4C.

The appearance of the scan patterns shown in FIGS. 4A-4B is now further described. Although the first and second RGB lasers 107a, 107b are aligned horizontally and spaced apart vertically in FIG. 4A for example, the lines drawn thereby are not shown as being aligned horizontally. To understand the appearance of scan line SL0, it should be understood that if scan lines SL(-1) and SL(-2) were to be shown, laser two (dashed line) in SL(-1) and SL(-2) would be horizontally aligned with laser one (solid line) in SL0 and SL1. Likewise, if scan lines SL8 and SL9 were to be shown, laser one (solid line) would be horizontally aligned with laser two (dashed line) in SL6 and SL7. The same logic applies to the scan pattern shown in FIG. 4B.

It should be understood that the laser scanning projector 100 may include more than two RGB lasers, and that these lasers may be in a variety of orientations. Each additional RGB laser used may further reduce the horizontal resonance frequency needed for a given resolution, with the total reduction in horizontal resonance frequency needed for a given resolution being equal to one over the number of RGB lasers used. It should also be understood that different horizontal scanning frequencies than those described above may be used, and that different scan patterns than those described above may be used. There may also be any number of scan patterns used, which scan in any order. In addition, rather than combining three lasers into a RGB laser, single color lasers may be used instead without combination. In addition, it should be understood that the orientations of the laser scanning projector 100 may be such that the horizontal mirror, horizontal scanning, and horizontal scanning rate are actually vertical but remain the fast axis mirror, faster scanning direction, and faster scanning rate. Similarly, in this case, the vertical mirror, vertical scanning, and vertical scanning rate becomes horizontal but remains the slow axis mirror, slow scanning direction, and slower scanning rate. Operation remains the same.

Figure 6:
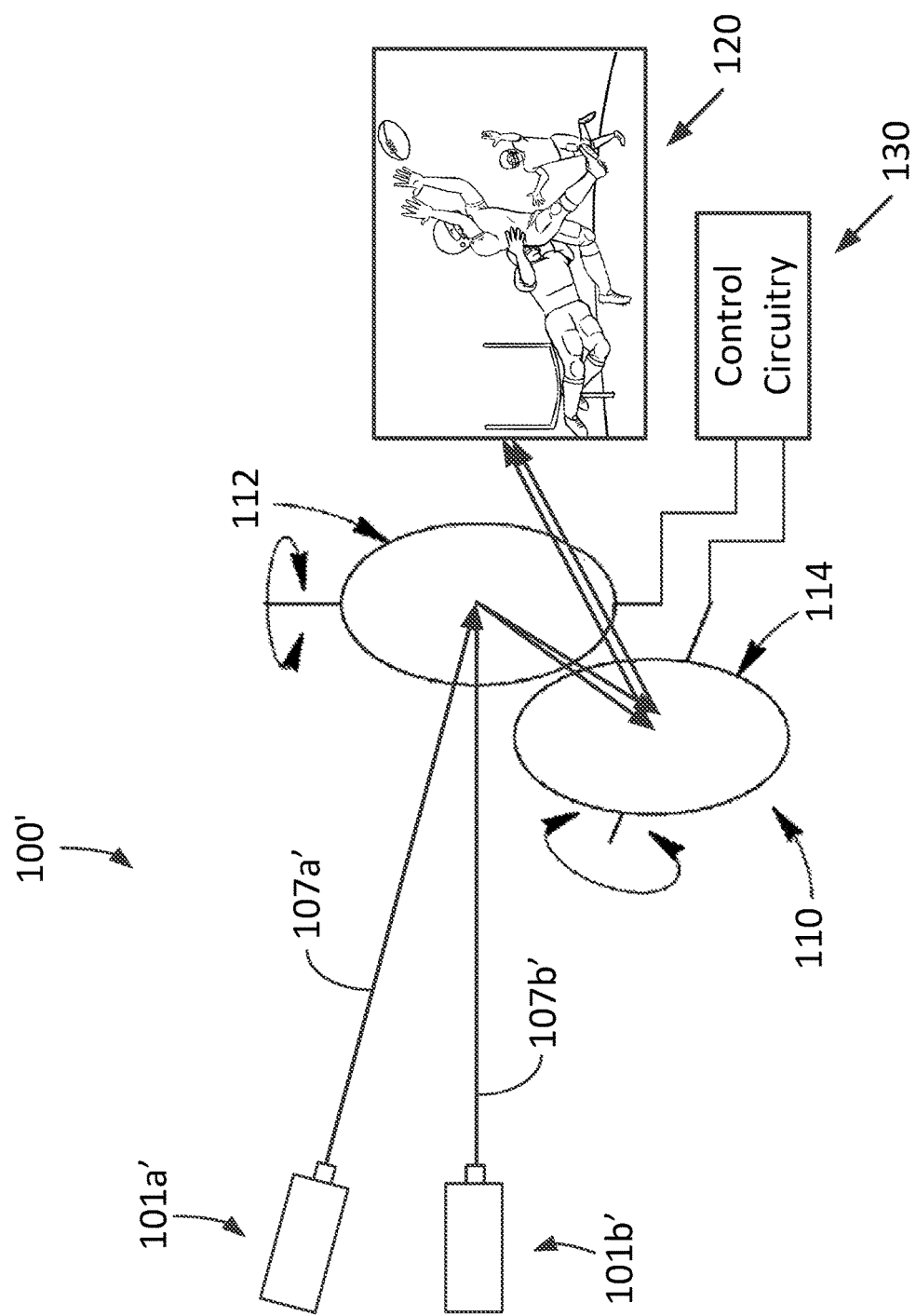
FIG. 6 shows a MEMS dual laser projector, utilizing infrared lasers, be used to form the scan patterns disclosed herein.

With reference to FIG. 6, an alternative configuration is now described. Here, the laser scanning projector 100' includes a first modulated infrared laser source 101a' and a second modulated infrared laser source 101b'. Output of the first and second modulated infrared laser sources 101a' and 101b' respectively produce a first infrared laser beam 107a' and a second infrared laser beam 107b'. Operation of this laser scanning projector 100' proceeds as described above, with the difference being the use of infrared lasers instead of RGB lasers.

Figure 5:
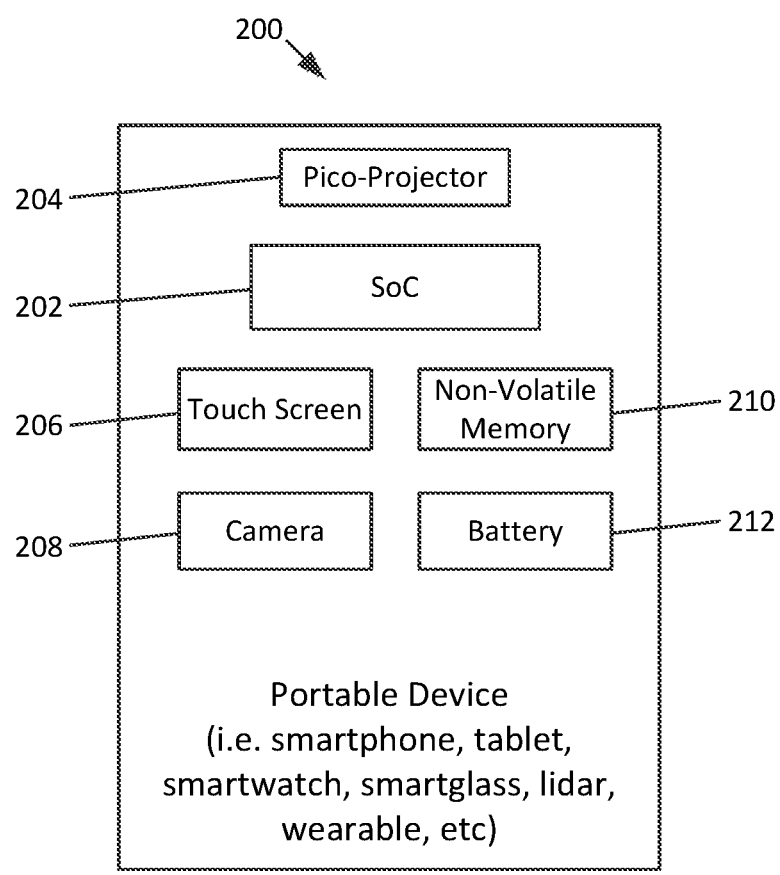
FIG. 5 shows an electronic device incorporating the dual frame scanning, dual laser projector described herein.

With reference to FIG. 5, a portable electronic device 200 incorporating the scanning laser projector 100 is now described. The portable electronic device 200 may be a smartphone, smartwatch, tablet, laptop, convertible, wearable, smartglass, lidar, smart headlamp, or other handheld device. The portable electronic device 200 includes a system on a chip 202 or other microprocessor, a touch screen 206 used to provide output to a user as well as receive input therefrom, a camera 208, non-volatile memory 210 such as flash RAM, and a battery 112 to power the portable electronic device 200. The system on a chip 202 may control the scanning laser projector 100.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

The invention claimed is:

1. An electronic device, comprising:
a first laser source configured to project a first laser beam;
a second laser source configured to project a second laser beam in alignment with the first laser beam in a first direction but at an angle with respect to the first laser beam in a second direction;
a mirror apparatus positioned so as to reflect the first and second laser beams; and
control circuitry configured to control the mirror apparatus to simultaneously reflect the first and second laser beams in a first scan pattern to form an first image, the first image formed from the first scan pattern having a number of scan lines greater than two times a horizontal resonance frequency at which the mirror apparatus oscillates divided by a desired frame rate of the first image.

2. The electronic device of claim 1, wherein the control circuitry controls the mirror apparatus such that the number of scan lines of the first scan pattern are equal to four times the horizontal resonance frequency at which the mirror apparatus oscillates divided by the desired frame rate of the first image.

3. The electronic device of claim 1, wherein the control circuitry is further configured to control the mirror apparatus to simultaneously reflect the first and second laser beams in a second scan pattern different than the first scan pattern to form a second image, the second image formed from the second scan pattern having a number of scan lines equal to greater than two times the horizontal resonance frequency at which the mirror apparatus oscillates divided by a frame rate of the second image.

4. The electronic device of claim 3, wherein the second image is formed from the second scan pattern having a number of scan lines equal to four times the horizontal resonance frequency at which the mirror apparatus oscillates divided by a frame rate of the second image; and wherein the first image is formed from the first scan pattern having a number of scan lines equal to four times the horizontal resonance frequency at which the mirror apparatus oscillates divided by a frame rate of the first image.

5. The electronic device of claim 3, wherein the control circuitry controls the mirror apparatus such that, in the second scan pattern, the first and second laser beams are vertically offset from their positions in the first scan pattern by at least one scan line.

6. The electronic device of claim 3, wherein the control circuitry controls the mirror apparatus so as to alternate between the first scan pattern and the second scan pattern.

7. The electronic device of claim 3, wherein the control circuitry controls the mirror apparatus such that, in the first scan pattern, the first laser beam begins scanning from a first edge of an outer perimeter scan line and the second laser beam begins scanning from a second edge of the outer perimeter scan line.

8. The electronic device of claim 7, wherein the control circuitry controls the mirror apparatus such that, in the second scan pattern, the first laser beam begins scanning from a middle of the outer perimeter scan line and the second laser beam begins scanning from the middle of the outer perimeter scan line.

9. The electronic device of claim 1, wherein the control circuitry controls the mirror apparatus such that, in the first scan pattern, the first laser beam and second laser beam remain horizontally synchronized during scanning of a plurality of scan lines.

10. The electronic device of claim 1, wherein the first direction is a horizontal direction; and wherein the second direction is a vertical direction.

11. An electronic device, comprising:
a first laser source configured to project a first unified RGB laser beam;
a second laser source configured to project a second unified RGB laser beam in alignment with the first unified RGB laser beam in a first direction but at an angle with respect to the first unified RGB laser beam in a second direction;
wherein the first laser source projects the first unified RGB laser beam at a same time as the second laser source projects the second unified RGB laser beam such that both the first and second unified RGB laser beams are simultaneously projected;
a mirror apparatus positioned so as to simultaneously receive and reflect the first and second unified RGB laser beams; and
control circuitry configured to control the mirror apparatus to simultaneously reflect the first and second unified RGB laser beams in a first scan pattern at a first time to form a first frame in which both of the first and second unified RGB laser beams are simultaneously displayed; and control the mirror apparatus to simultaneously reflect the first and second unified RGB laser beams in a second scan pattern different than the first scan pattern at a second time after the first time to form a second frame different than the first frame and in which both of the first and second unified RGB laser beams are simultaneously displayed;

wherein the control circuitry controls the mirror apparatus so as to alternate between the first scan pattern and the second scan pattern.

12. The electronic device of claim 11, wherein, in the second scan pattern, the first and second unified RGB laser beams are vertically offset from their positions in the first scan pattern by at least one scan line.

13. The electronic device of claim 11, wherein the control circuitry controls the mirror apparatus such that, in the first scan pattern, the first unified RGB laser beam begins scanning from a first edge of an outer perimeter scan line and the second unified RGB laser beam begins scanning from a second edge of the outer perimeter scan line.

14. The electronic device of claim 13, wherein the control circuitry controls the mirror apparatus such that, in the second scan pattern, the first unified RGB laser beam begins scanning from a middle of the outer perimeter scan line and the second unified RGB laser beam begins scanning from the middle of the outer perimeter scan line.

15. The electronic device of claim 11, wherein the control circuitry controls the mirror apparatus such that, in the first scan pattern, the first unified RGB laser beam and second unified RGB laser beam remain horizontally synchronized during scanning of a plurality of scan lines.

16. The electronic device of claim 11, wherein the first direction is a horizontal direction; and wherein the second direction is a vertical direction.

17. A method, comprising:
projecting a first unified RGB laser beam from a first laser source and at a same time as projecting a second unified RGB laser beans from a second laser source;
causing a mirror to alternate between:
simultaneously receiving and reflecting the first and second unified RGB laser beams in a first scan pattern at a first time to form a first frame in which both the first and second unified RGB laser beams are simultaneously displayed, and
simultaneously receiving and reflecting the first and second unified RGB laser beams in a second scan pattern different than the first scan pattern and at a second time after the first time to form a second frame different than the first frame, in which both the first and second unified RGB laser beams are simultaneously displayed; wherein the alternation of the mirror is only between the first scan pattern and the second scan pattern.

18. The method of claim 17, wherein, in the second scan pattern, the first and second unified RGB laser beams are vertically offset from their positions in the first scan pattern by at least one scan line.

19. The method of claim 17, wherein, in the first scan pattern, the first unified RGB laser beam begins scanning from a first edge of an outer perimeter scan tine and the second unified RGB laser beam begins scanning from a second edge of the outer perimeter scan line.

20. The method of claim 19, wherein, in the second scan pattern, the first unified RGB laser beam begins scanning from a middle of the outer perimeter scan line and the second unified RGB laser beam begins scanning from a middle of the outer perimeter scan line.

21. The method of claim 17, wherein, in the first scan pattern, the first unified RGB laser beam and second unified RGB laser beam remain horizontally synchronized during scanning of a plurality of scan lines.

22. An electronic device, comprising:
a first laser source configured to project a first unified RGB laser beam;
a second laser source configured to project a second unified RGB laser beam in alignment with the first unified RGB laser beam in a first direction but at an angle with respect to the first unified RGB laser beam in a second direction, wherein the first direction is a horizontal direction and wherein the second direction is a vertical direction;
wherein the first laser source projects the first unified RGB laser beam at a same time as the second laser source projects the second unified RGB laser beam such that both the first and second unified RGB laser beams are simultaneously projected;
a mirror apparatus positioned so as to simultaneously receive and reflect the first and second unified RGB laser beams; and
control circuitry configured to
control the mirror apparatus to simultaneously reflect the first and second unified RGB laser beams in a first scan pattern at a first time to form a first frame in which both of the first and second unified RGB laser beams are simultaneously displayed; and
control the mirror apparatus to simultaneously reflect the first and second unified RGB laser beams in a second scan pattern different than the first scan pattern at a second time after the first time to form a second frame different than the first frame and in which both of the first and second unified RGB laser beams are simultaneously displayed.

23. The electronic device of claim 22, wherein, in the second scan pattern, the first and second unified RGB laser beams are vertically offset from their positions in the first scan pattern by at least one scan line.

24. The electronic device of claim 22, wherein the control circuitry controls the mirror apparatus such that, in the first scan pattern, the first unified RGB laser beam begins scanning from a first edge of an outer perimeter scan line and the second unified RGB laser beam begins scanning from a second edge of the outer perimeter scan line.

25. The electronic device of claim 24, wherein the control circuitry controls the mirror apparatus such that, in the second scan pattern, the first unified RGB laser beam begins scanning from a middle of the outer perimeter scan line and the second unified RGB laser beam begins scanning from the middle of the outer perimeter scan line.

26. The electronic device of claim 22, wherein the control circuitry controls the mirror apparatus such that, in the first scan pattern, the first unified RGB laser beam and second unified RGB laser beam remain horizontally synchronized during scanning of a plurality of scan lines.

* * * * *

UNITED STATES PATENT AND TRADEMARK OFFICE
CERTIFICATE OF CORRECTION

PATENT NO. : 10,237,515 B2
APPLICATION NO. : 15/471333
DATED : March 19, 2019
INVENTOR(S) : Gilad Adler et al.

It is certified that error appears in the above-identified patent and that said Letters Patent is hereby corrected as shown below:

In the Claims

Column 9, Claim 17, Line 43, replace the word [[beans]] with the word -- beam --.

Column 9, Claim 19, Line 65, replace the word [[tine]] with the word -- line --.

Signed and Sealed this
Eighth Day of October, 2019

Andrei Iancu
*Director of the United States Patent and Trademark Office*